(12) United States Patent
Bean

(10) Patent No.: US 11,824,258 B2
(45) Date of Patent: Nov. 21, 2023

(54) ELECTROMAGNETIC ENERGY HARVESTING DEVICES AND METHODS

(71) Applicant: Richard A. Bean, Reno, NV (US)

(72) Inventor: Richard A. Bean, Reno, NV (US)

( * ) Notice: Subject to any disclaimer, the term of this patent is extended or adjusted under 35 U.S.C. 154(b) by 181 days.

(21) Appl. No.: 17/077,886

(22) Filed: Oct. 22, 2020

(65) Prior Publication Data

US 2021/0044004 A1 Feb. 11, 2021

Related U.S. Application Data

(63) Continuation of application No. 15/584,210, filed on May 2, 2017, now Pat. No. 10,854,960.

(51) Int. Cl.
*H01Q 1/24* (2006.01)
*H02J 50/20* (2016.01)
*H01Q 9/16* (2006.01)

(52) U.S. Cl.
CPC ............. *H01Q 1/248* (2013.01); *H02J 50/20* (2016.02); *H01Q 9/16* (2013.01)

(58) Field of Classification Search
CPC . H01Q 1/248; H01Q 9/16; H02J 50/20; H02J 50/001; H02J 50/27
See application file for complete search history.

(56) References Cited

U.S. PATENT DOCUMENTS

| | | | |
|---|---|---|---|
| 6,967,462 B1 | 11/2005 | Andis | |
| 7,307,589 B1 * | 12/2007 | Gregoire | H01Q 1/248 343/700 MS |
| 8,115,683 B1 * | 2/2012 | Stefanakos | H01Q 1/248 136/255 |
| 8,228,194 B2 | 7/2012 | Mickle et al. | |
| 8,362,745 B2 * | 1/2013 | Tinaphong | H02J 50/27 320/108 |
| 9,010,648 B2 * | 4/2015 | Kai | G06K 19/07783 235/487 |
| 9,437,629 B1 | 9/2016 | Davids et al. | |
| 9,438,045 B1 * | 9/2016 | Leabman | G05F 1/67 |
| 9,644,401 B2 * | 5/2017 | Nguyen | H02J 7/0042 |
| 9,837,865 B2 * | 12/2017 | Mitcheson | H02J 50/001 |
| 9,871,298 B2 * | 1/2018 | Daniel | H01Q 9/16 |
| 10,050,470 B1 | 8/2018 | Leabman | |
| 10,965,167 B2 * | 3/2021 | Jiang | H02J 50/001 |
| 11,317,263 B2 * | 4/2022 | Elboim | H01Q 1/38 |

(Continued)

OTHER PUBLICATIONS

Agilent Technologies "Application Note 1088: Designing the Virtual Battery," AN (1088), Nov. 1, 1999, www.semiconductor.agilentcom, ppg_ 1-8_.

(Continued)

*Primary Examiner* — Hai V Tran
*Assistant Examiner* — Bamidele A Jegede
(74) *Attorney, Agent, or Firm* — Holland & Hart LLP

(57) ABSTRACT

An electromagnetic energy harvesting device includes an emitting body at least partially embedded within a dielectric medium, and a receiving antenna disposed in proximity to the emitting body, where the receiving antenna is configured to collect thermal electromagnetic energy emitted by the emitting body. The device also includes a rectifier electrically coupled to the receiving antenna, where the rectifier is configured to convert the thermal electromagnetic energy to direct current electrical energy.

25 Claims, 5 Drawing Sheets

(56) References Cited

U.S. PATENT DOCUMENTS

| | | | |
|---|---|---|---|
| 2002/0190689 A1 | 12/2002 | Nakamura et al. | |
| 2003/0017804 A1 | 1/2003 | Heinrich et al. | |
| 2003/0137400 A1 | 7/2003 | Heinrich et al. | |
| 2004/0005863 A1 | 1/2004 | Carrender | |
| 2004/0085247 A1 | 5/2004 | Mickle et al. | |
| 2004/0259604 A1 | 12/2004 | Mickle et al. | |
| 2005/0104553 A1* | 5/2005 | Mickle | H02J 50/00 320/101 |
| 2005/0248438 A1 | 11/2005 | Hughes et al. | |
| 2005/0259030 A1 | 11/2005 | Mizuno et al. | |
| 2006/0094425 A1* | 5/2006 | Mickle | G06K 7/0008 455/434 |
| 2006/0170217 A1 | 8/2006 | Kugel | |
| 2007/0082646 A1 | 4/2007 | Behzad et al. | |
| 2007/0109121 A1* | 5/2007 | Cohen | H04Q 9/00 340/693.1 |
| 2007/0178857 A1 | 8/2007 | Greene et al. | |
| 2009/0102083 A1 | 4/2009 | Cochran et al. | |
| 2009/0152954 A1 | 6/2009 | Le et al. | |
| 2009/0289776 A1 | 11/2009 | Moore et al. | |
| 2010/0134257 A1 | 6/2010 | Puleston et al. | |
| 2010/0141051 A1* | 6/2010 | Vollaire | H02J 7/025 307/151 |
| 2010/0270967 A1* | 10/2010 | Cho | H01M 10/46 320/101 |
| 2011/0062790 A1* | 3/2011 | Kouki | H02J 50/27 307/104 |
| 2011/0101789 A1 | 5/2011 | Salter, Jr. et al. | |
| 2011/0160542 A1* | 6/2011 | Ahn | H01Q 1/248 600/300 |
| 2011/0175461 A1 | 7/2011 | Tinaphong | |
| 2011/0277805 A1 | 11/2011 | Novack et al. | |
| 2012/0019098 A1 | 1/2012 | Erbil et al. | |
| 2012/0106103 A1 | 5/2012 | Nohra | |
| 2012/0218799 A1 | 8/2012 | Furukawa et al. | |
| 2013/0018438 A1* | 1/2013 | Chow | A61N 1/3787 607/60 |
| 2013/0018439 A1* | 1/2013 | Chow | A61N 1/0556 607/60 |
| 2013/0249771 A1* | 9/2013 | Kotter | H01Q 1/248 29/601 |
| 2013/0261703 A1* | 10/2013 | Chow | A61N 1/40 607/61 |
| 2014/0361629 A1* | 12/2014 | Moon | H02J 50/001 307/104 |
| 2014/0366927 A1* | 12/2014 | Lavrova | H02S 10/30 438/74 |
| 2015/0171251 A1 | 6/2015 | Rotschild et al. | |
| 2015/0256097 A1 | 9/2015 | Gudan et al. | |
| 2015/0326059 A1 | 11/2015 | Abu Qahouq | |
| 2015/0372541 A1* | 12/2015 | Guo | H02M 1/32 307/104 |
| 2016/0020631 A1* | 1/2016 | Manova-Elssibony | H02J 50/10 307/104 |
| 2016/0094091 A1* | 3/2016 | Shin | H01Q 1/248 307/104 |
| 2016/0134150 A1 | 5/2016 | Chen et al. | |
| 2016/0181867 A1* | 6/2016 | Daniel | H01Q 9/26 307/104 |
| 2016/0191121 A1 | 6/2016 | Bell et al. | |
| 2016/0204643 A1* | 7/2016 | Manova-Elssibony | H02J 50/40 320/108 |
| 2016/0301257 A1 | 10/2016 | Parks et al. | |
| 2016/0308402 A1 | 10/2016 | Alavikia et al. | |
| 2016/0359378 A1 | 12/2016 | Kuhn et al. | |
| 2017/0070079 A1* | 3/2017 | Manova-Elssibony | H02J 7/042 |
| 2017/0117753 A1* | 4/2017 | Charthad | A61N 1/37217 |
| 2017/0358957 A1 | 12/2017 | Mitcheson et al. | |
| 2018/0152054 A1* | 5/2018 | Kamata | H02J 50/40 |
| 2018/0183274 A1* | 6/2018 | Auten | H01Q 1/248 |
| 2022/0166251 A1* | 5/2022 | Harish Gopala Pillai | H05B 47/19 |

OTHER PUBLICATIONS

Babu et al., "Improved Design of Rectanna for Wireless Power Transmission", International Conference on Computing, Communication and Information Technology (ICCCIT 2012), Jun. 27-29, 2012 (Year: 2012).

D'Souza, Matthew, Konstanty Bialkowski, Adam Pastula, and Montserrat Ros. "A Wireless Sensor Node Using Remote Power Charging, for Interaction Applications." In Proceedings of the 10th Euromicro Conference Digital System Design Architectures, Methods and Tools, pp. 485-494. IEEE Computer Society, 2007.

Zbitou, Jamal, Mohamed Latrach, and Serge Toutain. "Hybrid rectanna and monolithic integrated zero-bias microwave rectifier." IEEE Transactions on Microwave Theory and Techniques 54, No. 1 (2006): 147-152.

Merabet, Boubekeur, et al., "Low-cost Converter for Harvesting Microwave Electromagnetic Energy," 978-1-4244-2893-9/09 IEEE 2009, ppg 2592-2599.

Shameli et al., "Power Harvester Design for Passive UHF RFID Tag Using a Voltage Boosting Technique", IEEE Transactions on Microwave Theory and Techniques, vol. 55, No. 6, Jun. 2007 (Year: 2007).

Shinohara, Naoki, "Power without Wires," IEEE Microwave Magazine, 1527-3342/11, Dec. 2011, ppg. S64-S73.

Theeuwes, Jeroen, et al., "Efficient, Compact.Wireless Battery Design," Proceedings of 10th European Conference on Wireless Technology, Oct. 2007, Munich Germany, 978-2-87487-003-3, ppg 233-236.

Wang et al., "Rectanna Design for Energy Harvesting", IEEE Asia Pacific Conference on Circuits and Systems (APCCAS), Oct. 2016 (Year: 2016).

Xi et al., "Optimum ASK Modulation Scheme for Passive RFID Tags Under Antenna Mismatch Conditions", IEEE Transactions on Microwave Theory and Techniques, vol. 57, No. 10, Oct. 2009 (Year: 2009).

Youn, Dong-Gi, et al., "A Study on the Fundamental Transmission Experiment for Wireless Power Transmission System," 1999 IEEE TENCON, 0-7803-5739/6/1999, ppg 1419-1422.

Johnson et al. "Space-based Solar Power: Possible Defense Applications and Opportunities for N RL Contributions", Naval Research Laboratory Washington, DC 20375-5320, Oct. 23, 2009 (Year: 2009).

Lu et al. "Wireless Charging Technologies: Fundamentals, Standards, and Network Applications", IEEE Communications Surveys & Tutorials, vol. 18, No. 2, Second Quarter 2016. (Year: 2016).

Adami et al. "Ultra-low Power Autonomous Power Management System with Effective Impedance Matching for RF EnergyHarvesting", CIPS 2014, Feb. 25-27, 2014, Nuremberg/Germany (Year: 2014).

Zhang et al. "An Investigation of Wideband Rectennas for Wireless Energy Harvesting", Wireless Engineering and Technology, 2014, 5, 107-116. (Year: 2014).

\* cited by examiner

ELECTROMAGNETIC ENERGY HARVESTING DEVICES AND METHODS

CROSS-REFERENCE TO RELATED APPLICATION

This application is a continuation of and claims priority to and the benefit of U.S. patent application Ser. No. 15/584,210, filed May 2, 2017, and entitled ELECTROMAGNETIC ENERGY HARVESTING DEVICES AND METHODS, which is hereby incorporated by reference in its entirety.

BACKGROUND

The subject matter disclosed herein relates to electromagnetic energy harvesting devices and methods and, more particularly, to electromagnetic energy harvesting devices and methods in which thermal electromagnetic energy emitted by an emitting body is collected by a receiving antenna disposed in proximity to the emitting body and converted to direct current electrical energy.

Devices for transmitting and receiving electromagnetic energy have been developed in the past. For example, devices have been developed for sending electromagnetic energy across different portions of the frequency spectrum, such as, for example, across the radio frequency portion of the spectrum as well as across the infrared and microwave portions of the spectrum.

In the case of devices designed to send and receive within the infrared and microwave portions of the spectrum, at least some of these devices are only able to recover a small amount of the transmitted power due to distance related path losses and absorbing materials such as water vapor in the atmosphere. In addition, many conventional infrared energy transmission devices have depended upon rectifiers capable of very fast operation (e.g., metal-insulator-metal diodes and tunnel diodes). Such diodes have been incorporated in the designs of harvesting devices to accommodate the higher infrared frequencies and the associated ionizing photon energy levels.

Devices and methods for harvesting larger quantities (e.g., greater than several microwatts) of electromagnetic energy within the far infrared (sometimes called terahertz range) and microwave portions of the electromagnetic frequency spectrum are therefore desirable. In addition, devices and methods capable of harvesting microwave and far infrared electromagnetic energy that do not depend upon fast switching rectifiers, such as metal-insulator-metal diodes and tunnel diodes, are also, in some cases, desirable.

BRIEF DESCRIPTION

In one aspect, an electromagnetic energy harvesting device is provided. The device includes an emitting body at least partially embedded within a dielectric medium, and a receiving antenna disposed in proximity to the emitting body, where the receiving antenna is configured to collect thermal electromagnetic energy emitted by the emitting body. The device also includes a rectifier electrically coupled to the receiving antenna, where the rectifier is configured to convert the thermal electromagnetic energy to direct current electrical energy.

In another aspect, an electromagnetic energy harvesting device is provided. The device includes a first portion and a second portion. The first portion includes a first emitting body, a first receiving antenna configured to collect thermal electromagnetic energy emitted by the first emitting body, and a first rectifier electrically coupled to the first receiving antenna, where the first rectifier is configured to convert the thermal electromagnetic energy emitted by the first emitting body to direct current electrical energy. Similarly, the second receiving portion includes a second emitting body, a second receiving antenna configured to collect thermal electromagnetic energy emitted by the second emitting body, and a second rectifier electrically coupled to the second receiving antenna, where the second rectifier is configured to convert the thermal electromagnetic energy emitted by the second emitting body to direct current electrical energy.

In yet another aspect, a method for harvesting electromagnetic energy is provided. The method includes providing an electromagnetic energy harvesting device, where the device includes an emitting body at least partially embedded within a dielectric medium, a receiving antenna disposed in proximity to the emitting body, and a rectifier electrically coupled to the receiving antenna. The method also includes collecting thermal electromagnetic energy at the receiving antenna, and converting the thermal electromagnetic energy to direct current electrical energy at the rectifier.

In yet another aspect, an electromagnetic energy harvesting device is provided. The device includes a receiving antenna configured to collect thermal electromagnetic energy emitted by an emitting body, a reflecting element coupled to the receiving antenna, and a rectifier electrically coupled to the receiving antenna, where the rectifier is configured to convert the thermal electromagnetic energy to direct current electrical energy.

DRAWINGS

These and other features, aspects, and advantages of the present disclosure will become better understood when the following detailed description is read with reference to the accompanying drawings in which like characters represent like parts throughout the drawings, wherein.

Figure 1:
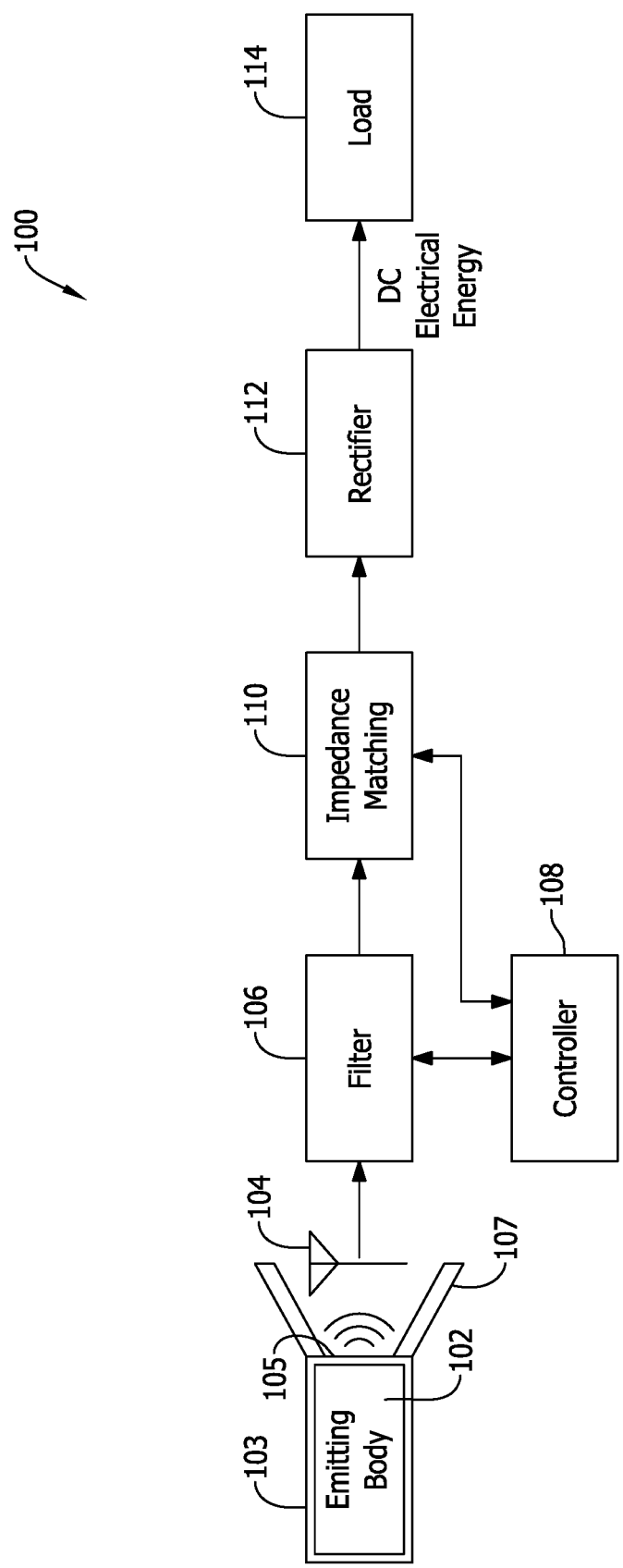
FIG. 1 is a schematic view of an exemplary electromagnetic energy harvesting device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "controller," "processor," "computer," and related terms, e.g., "processing device" and "computing device," are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In addition, as used herein, a "dielectric medium" may be any medium that supports the transfer of radiative energy. In various embodiments, a dielectric medium may include one or more layers of dielectric and/or magnetic materials in the dielectric medium's transfer path between an emitting body and an antenna, such as a receiving antenna. For example, in some embodiments, air and/or a vacuum are exemplary dielectric mediums that support the transfer of radiative energy. In other embodiments, materials such as glass, plastics, and water are exemplary dielectric mediums, each of which may include various dielectric properties. In various embodiments, such materials may, in addition, embed, or be embedded with, materials having magnetic properties.

Embodiments of the present disclosure relate to a device for harvesting electromagnetic energy and, more particularly, to a device for harvesting electromagnetic energy, in which thermal electromagnetic energy emitted by an emitting body is collected by a receiving antenna disposed in proximity to the emitting body and converted to direct current electrical energy. To this end, the receiving antenna may be coupled (directly or indirectly) to a rectifier, which may convert thermal electromagnetic energy impinging upon and collected by the receiving antenna to direct current electrical energy. The device may be constructed and implemented, as described herein, such that a total or overall gain of the device is increased and/or decreased through the addition and/or subtraction of a plurality of thermodynamic gain components within the device. Thus, the device may generate direct current electrical energy suitable to power a load coupled to the device.

The Friis transmission equation is commonly used in telecommunications engineering to calculate the power received by an antenna under idealized conditions given another antenna some distance away transmitting a known amount of power. The Friis transmission equation is as follows:

$$P_R = G_T \cdot G_R \cdot P_T \cdot \left(\frac{1}{4\pi} \cdot \frac{c}{r \cdot f}\right)^2,$$

where $P_R$ is the power at the receiver, $G_T$ is the gain at the transmitter, $G_R$ is the gain at the receiver, $P_T$ is the power of the transmitter, c is the speed of light, r is the distance between the transmitter and the receiver, and f is the operating frequency of the electromagnetic radiation.

Accordingly, the power at the receiver, $P_R$, may be increased as a function of the gain at the receiver, $G_R$, and/or the gain at the transmitter, $G_T$. Increasing either of these gains ($G_R$ and/or $G_T$) results in an increased output power at the receiver.

In the case of a device, such as a receiving antenna (as described herein), that is configured to receive thermal electromagnetic energy for the purpose of converting the received energy to direct current electrical energy, $G_R$ and/or $G_T$ may be thought of as being dependent upon, or influenced by, the thermodynamic properties of the transmission system (e.g., the thermodynamic properties of the transmitting and receiving antennas as well as the intervening transmission medium). Thus, in general terms, the multiplicative $G_R$ and/or $G_T$ may be specified in terms of a plurality of logarithmic gain components (many of which are thermodynamic gain components) as follows:

$G_T = G_{HS} = G_{HSG} + G_e + G_{e'} + G_{Hr}$ (Logarithmic Version)

$G_T = G_{HS} = G_{HSG} \times G_e \times G_{e'} \times G_{Hr}$ (Multiplicative Version)

$G_R = G_A + G_{Ar} + G_{SW} + G_{AGW} + G_{PIM} + G_{IM}$ (Logarithmic Version)

$$G_R = G_A \times G_{Ar} \times G_{SW} \times G_{AGW} \times G_{PIM} \times G_{IM} \quad \text{(Multiplicative Version)}$$

In the expressions above, $G_{HS}$ is the gain contributed to the system by the heat source (or the emitting body, as described below), $G_{HSG}$ is the gain introduced by the geometry of the emitting body (where some emitting bodies emit electromagnetic energy at greater intensities than others due to controllable temperatures and material characteristics), $G_e$ is the emissivity of the emitting body, $G_{\varepsilon r}$ is the relative electrical permittivity of the radiating medium, and $G_{Hr}$ is the gain contributed by reflecting elements (as described below) introduced within the transmission system.

Similarly, $G_A$ is the gain provided by the antenna geometry and materials, $G_{Ar}$ is the gain provided by reflectors at the receiving antenna. Common reflecting structures include horns and parabolic dishes. $G_{SW}$ are gains achieved when electromagnetic waves are intentionally reflected to create standing waves. $G_{ABW}$ gains are the gains achieved by the amount of bandwidth that is aggregated through filtering and antenna selection. $G_{PIM}$ are gains that are achieved by passively triggering intermodulation products through the intentional creation of non-linear behavior in electronic devices. $G_{IM}$ are impedance matching gains or attenuations where circuit impedances are engineered to manage reflections from devices like diodes and antennas regulating the power flow.

Thus, the power at the receiver may be modified (e.g., increased as well as decreased) based upon selections of a plurality of gain components, including in many cases a plurality of thermodynamic gain components, as defined above.

FIG. 1 is a schematic view of an exemplary electromagnetic energy harvesting device 100. As shown, device 100 includes an emitting body 102, a receiving antenna 104, a filter 106, a reflecting element 107, a controller 108, an impedance matching element 110, a rectifier 112, and/or a load 114. In some embodiments, device 100 may exclude emitting body 102, but may be configured to operate in proximity to an emitting body 102 (as described herein). In addition, in some embodiments, device 100 may exclude filter 106, controller 108, and/or impedance matching element 110, such that, for example, receiving antenna 104 is directly coupled to rectifier 112. Further, in various embodiments, the components of device 100 may be selected to encourage intermodulation gains, such as passive intermodulation gains, within device 100.

Emitting body 102 is any mass capable of emitting electromagnetic energy, such as thermal electromagnetic energy in the microwave and/or far infrared frequency ranges. For convenience, and as used herein, the microwave range is approximately the range of the electromagnetic frequency spectrum between 300 Megahertz (MHz) and 300 Gigahertz (GHz), and the far infrared range is approximately the range of the electromagnetic frequency spectrum between 300 GHz and 20 Terahertz (THz).

In some embodiments, emitting body 102 is at least partially embedded in a dielectric medium 103, such as, for example, any dielectric medium having a low permittivity. More particularly, emitting body 102 may be partially embedded in dielectric medium 103 and/or totally embedded in dielectric medium 103. As a result, the intensity of thermal electromagnetic energy emitted by emitting body 102 within dielectric medium 103 may be amplified at a dielectric medium-air interface 105, such that the intensity of the energy at interface 105 is directed or focused and thus in excess of the intensity of the energy emitted by emitting body 102 absent dielectric medium 103. In other words, emitting body 102 may be partially or totally embedded in dielectric medium 103 to increase and/or decrease (as desired) a thermodynamic gain component (e.g., $G_{\varepsilon r}$) of device 100.

In various embodiments, emitting body 102 is also capable of absorbing electromagnetic energy, such as electromagnetic energy in any part of the spectrum (e.g., in the visible part of the spectrum). Thus, emitting body 102 may absorb electromagnetic energy, store the energy as heat energy, and emit electromagnetic energy (e.g., thermal radiation), at least, in the microwave and/or far infrared portions of the spectrum. Further, in various embodiments, controller 108 may be configured to monitor and/or alter (e.g., adjust) a temperature of emitting body 102. For example, where emitting body is a gas furnace, controller 108 may be configured to control a temperature of the gas furnace and/or a heat output generated by the gas furnace.

Similarly, controller 108 may be configured to track motion of emitting body 102, such as, for example, where emitting body is in motion and such that receiving antenna 104 maintains a specified (e.g., optimal) orientation towards emitting body 102. To this end, device 100 may include one or more joints (e.g., rotatable or slidable joints), which may be electromechanically actuated by controller 108 to maintain or adjust an orientation of receiving antenna 104 to emitting body 102.

Further, the geometry (e.g., size and/or shape) of emitting body 102 may be selected to increase and/or decrease the quantity of thermal electromagnetic energy emitted by emitting body 102. Specifically, a larger and/or denser emitting body 102 may be selected to increase the quantity of energy emitted by emitting body 102, and a smaller and/or less dense emitting body 102 may be selected to reduce the quantity of energy emitted by emitting body 102. Similarly, the shape of emitting body 102 may be varied to increase and/or decrease the quantity of electromagnetic energy emitted. Thus, in general terms, the geometry of emitting body 102 may be varied to modify a thermodynamic gain component (e.g., $G_{HSG}$) of device 100.

Further still, in various embodiments, the material composition of emitting body 102 may be selected to increase and/or decrease the quantity of thermal electromagnetic energy emitted by emitting body 102. Specifically, a material composition having a high emissivity (e.g., an emissivity close to 1) may be selected to increase the quantity of thermal electromagnetic energy emitted by emitting body 102. Contrariwise, a material composition having a lower emissivity (e.g., an emissivity closer to 0) may be selected to decrease the quantity of thermal electromagnetic energy emitted by emitting body 102. Thus, in general terms, the material composition of emitting body 102 may be varied to modify a thermodynamic gain component (e.g., $G_e$) of device 100.

Receiving antenna 104 is any antenna capable of receiving and collecting electromagnetic energy, such as, for example, thermal electromagnetic energy. More particularly, receiving antenna 104 is an antenna capable of receiving and collecting microwave and/or far infrared electromagnetic energy. Thus, in various embodiments, receiving antenna 104 may be a monopole antenna, a dipole antenna, a rectangular microstrip antenna (e.g., a "patch antenna"), a Yagi-Uda antenna, an aperture antenna (e.g., a horn antenna), a waveguide, an array of one or more antennas (such as an array of patch antennas), and the like. In addition, in some embodiments, receiving antenna 104 is an overmode waveguide.

Filter 106 is any suitable frequency filter, such as, for example, any suitable low pass filter, any suitable band pass filter, and/or any suitable high pass filter. Filter 106 may be incorporated into the antenna structure. As shown, filter 106 is electrically coupled to receiving antenna 104, such as by way of one or more electrical conductors. In the exemplary embodiment, filter 106 is further communicatively coupled to controller 108, which may, as described herein, provide one or more control signals to filter 106.

In the exemplary embodiment, filter 106 may be a variable or tunable filter, such as a tunable low pass filter, a tunable band pass filter, and/or a tunable high pass filter. For example, filter 106 may be tunable during operation, such that the bandwidth passed by filter 106 may be varied, tuned, or adjusted based upon one or more operating parameters, such as a power delivered to receiving antenna 104 and/or a power delivered to rectifier 112.

More particularly, filter 106 may be tuned to reduce a passed bandwidth in response to a determination (e.g., by controller 108) that a threshold amount of power is being collected by receiving antenna 104 and/or transmitted to rectifier 112. Similarly, filter 106 may be tuned to increase a passed bandwidth in response to a determination (e.g., by controller 108) that a threshold amount of power is not being collected by receiving antenna 104 and/or transmitted to rectifier 112. Accordingly, filter 106 may be tuned to vary the power generated by device 100. Further, in the exemplary embodiment, controller 108 may tune filter 106 dynamically (e.g., in real time) based upon the amount of thermal electromagnetic energy received at antenna 104. Thus, in general terms, filter 106 may be tuned or adjusted to vary a thermodynamic gain component (e.g., $G_{ABW}$) of device 100.

Reflecting element 107 is any element having a surface configured to reflect thermal electromagnetic energy and configured to guide thermal electromagnetic energy from emitting body 102 to receiving antenna 104. In the exemplary embodiment, reflecting element 107 is a pyramidal or conical (e.g., "horn") reflector. Thus, in general terms, reflecting element 107 may be included between emitting body 102 and receiving antenna 104 to vary a thermodynamic gain component (e.g., $G_{Ar}$) of device 100.

Controller 108 is any suitable controller, such as any microcontroller, any processor or plurality of processors, any logic unit, and the like. In the exemplary embodiment, controller 108 is communicatively coupled to a tangible, non-transitory, computer-readable storage media (not shown), which may store computer readable instructions, which, when executed by controller 108, may cause controller 108 to perform operations as described herein, such as, for example, operations for tuning filter 106 (as described above) and/or operations for adjusting impedance matching element 110. In addition, in various embodiments, controller 108 may monitor and/or alter power production of device 100, including, for example, power production characteristics such as a temperature of emitting body 102, dynamic tracking of energy fluctuations within device 100, and/or demands, such as power consumption demands, exhibited by load 114.

Impedance matching element 110 is any electrical circuit and/or any electrical component configured to match, or to mismatch, impedance between filter 106 and rectifier 112. For example, in some embodiments, impedance matching element may include one or more tuning stubs, one or more resistors, one or more capacitors or equivalents, one or more inductors or equivalents, and the like. To this end, impedance matching element 110 is electrically coupled between filter 106 and rectifier 112. In the exemplary embodiment, impedance matching element 110 is further communicatively coupled to controller 108, which may, as described herein, provide one or more control signals to impedance matching element 110 to control impedance matching element 110. Thus, in general terms, impedance matching element 110 may be included to vary a thermodynamic gain component (e.g., $G_{IM}$) of device 100.

Rectifier 112 is any device capable of converting alternating electrical current to direct electrical current. In the exemplary embodiment, rectifier 112 is a diode, such as, for example, a Schottky diode. However, in other embodiments, rectifier 112 is any diode or plurality of diodes in parallel capable of converting alternating electrical current from a microwave and/or far infrared frequency to direct electrical current. Thus, in some embodiments, rectifier 112 may be a metal-insulator-metal oxide (MIM) diode and/or a tunnel diode. More particularly, and as described herein, rectifier 112 may be implemented as a Schottky diode for the purpose of harvesting electromagnetic energy in the microwave and far infrared portions of the frequency spectrum. Rectifier 112 may, in addition, be implemented as a MIM diode and/or a tunnel diode for the purpose of harvesting electromagnetic energy in the near infrared portion of the frequency spectrum.

Further, in various embodiments, rectifier 112 may include a plurality of diodes and/or any other suitable circuitry for converting alternating current electrical energy to direct current electrical energy. In addition, and as shown, rectifier 112 is electrically coupled to impedance matching element 110. In some embodiments, impedance matching element 110 is excluded from device 100, and rectifier 112 is electrically coupled to filter 106. Similarly, in some embodiments, filter 106 is excluded from device 100, and rectifier 112 is electrically coupled to receiving antenna 104.

Load 114 is any electrical load that may be coupled to an output of rectifier 112. Thus, load 114 may draw direct current electrical energy from rectifier 112, such that load 114 is powered by device 100. For instance, in some embodiments, load 114 may be a mobile communications device, such as a mobile telephone and/or a smartphone, a tablet computing device, and the like. Where load 114 is embodied as a mobile communications device, all or a portion of device 100 may be mounted on or within and/or otherwise coupled to the mobile communications device. For instance, receiving antenna 104 may be mounted on a surface of a mobile communications device as a patch antenna (as described above).

Figure 2:
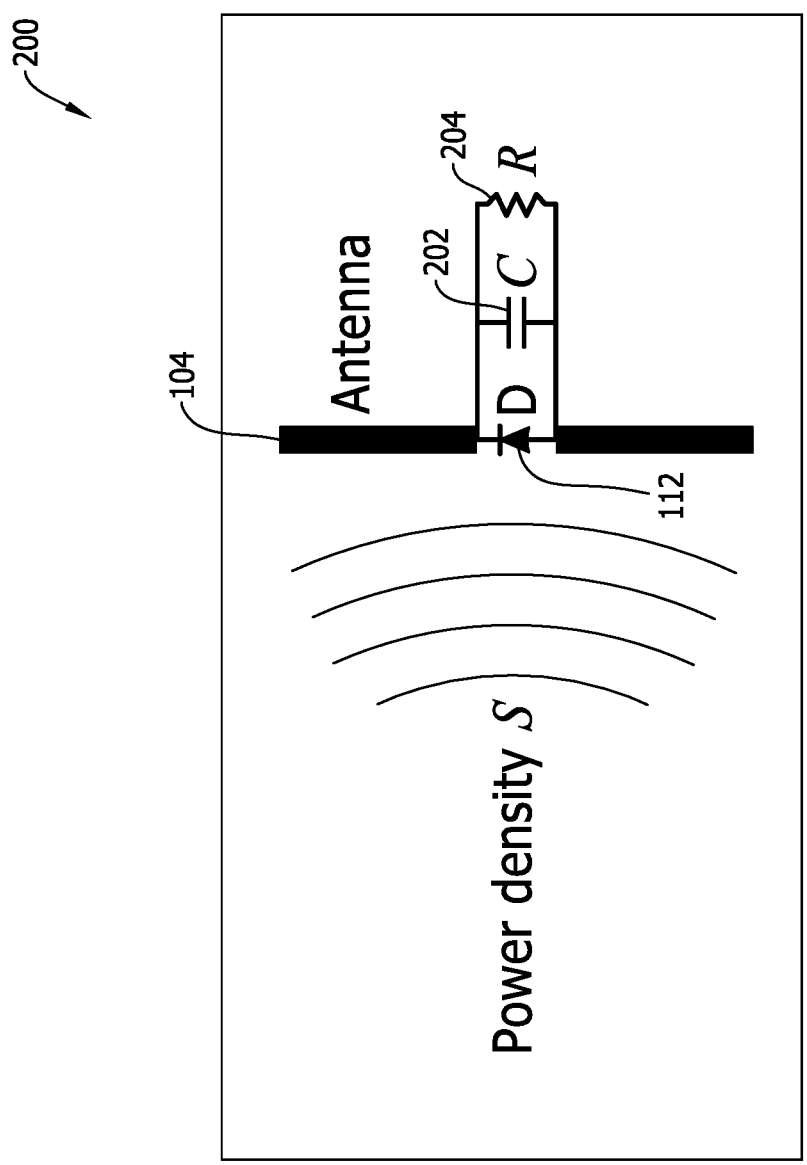
FIG. 2 is a circuit diagram of an exemplary rectenna of the electromagnetic energy harvesting device of FIG. 1.

FIG. 2 is a circuit diagram of an exemplary rectenna 200 of electromagnetic energy harvesting device 100 (shown at FIG. 1). More particularly, in various embodiments, one or more components of device 100, such as receiving antenna 104 and rectifier 112, may be combined to produce rectenna 200. Thus, as shown, rectenna 200 may include receiving antenna 104, rectifier 112, a capacitor 202, and/or a resistor 204. In various embodiments, capacitor 202 and/or resistor 204 may perform filtering and/or impedance matching functions, such as those described above with reference to filter 106 and/or impedance matching element 110. While FIG. 2 illustrates a half-wave rectifier, another embodiment may be a full-wave rectifier. Voltage multiplier techniques may be included in the rectifying circuit to raise the voltage magnitude of device 100 and/or rectenna 200.

Figure 3:
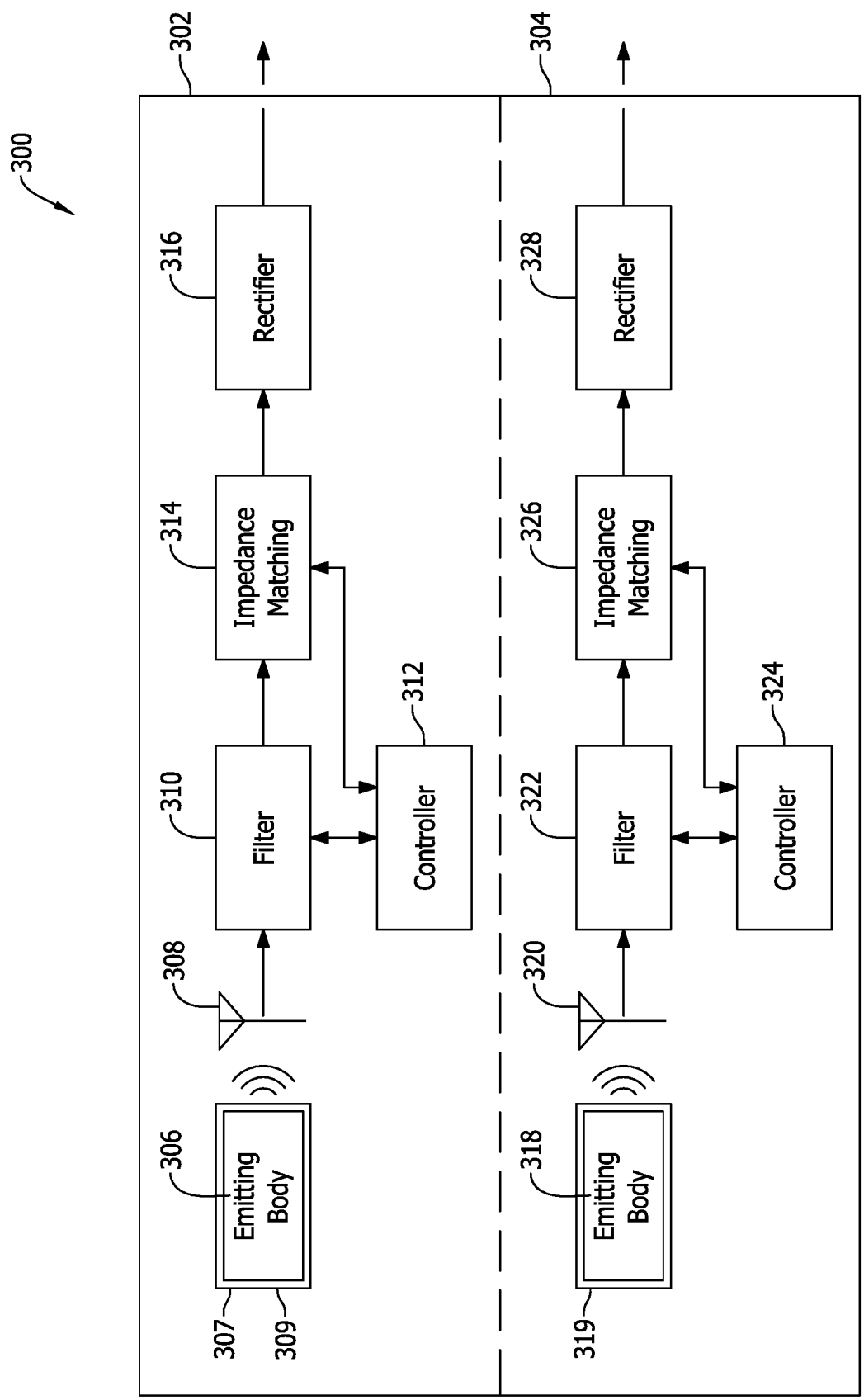
FIG. 3 is a schematic view of an exemplary stacked electromagnetic energy harvesting device where an emitting body can be sandwiched between harvesting devices.

FIG. 3 is a schematic view of an exemplary stacked electromagnetic energy harvesting device 300. In the exemplary embodiment, stacked device 300 includes a first portion 302 and a second portion 304. First portion 302 is a first device, which is substantially identical to device 100. Similarly, second portion 304 is a second device, which is substantially identical to device 100. First portion 302 and second portion 304 may be electrically coupled in series or in parallel and to produce direct current electrical energy, as described herein. Emitting bodies 306 and 318 can be sandwiched between the first portion 302 and the second portion 304 such that both sides of the emitting bodies 306 and 318 can be used. For instance, with respect to emitting body 306, an opposite side 309 of emitting body 306 may also be used. Where such a configuration is implemented, a receiving antenna (not shown) may be disposed in a line of sight of opposite side 309 to collected thermal electromagnetic energy emitted by opposite side 309 of emitting body 306.

Heat exchange fluids (e.g., eutectic mixtures of stable compounds, such as diphenyl and biphenyl oxide, synthetic organic fluids, and the like) can be used to maintain the temperature of the emitting bodies 306 and 318. Further, in various embodiments, stacked device 300 may include any number of stacked portions, and as additional portions are added to the stack, stacked device 300 may generate an increasing amount of current and/or voltage (depending, for example, upon the interconnection between stacked portions).

Accordingly, first portion 302 includes a first emitting body 306, a first receiving antenna 308, a first filter 310, a first controller 312, a first impedance matching element 314, and/or a first rectifier 316. Similarly, second portion 304 includes a second emitting body 318, a second receiving antenna 320, a second filter 322, a second controller 324, a second impedance matching element 326, and/or a second rectifier 328. Although not shown, first portion 302 and/or second portion 304 may include reflecting elements (such as reflecting element 107 as shown with respect to device 100). In some embodiments, first portion 302 may be fabricated as a rectenna, such as rectenna 200 (shown at FIG. 2). Similarly, in some embodiments, second portion 304 may be fabricated as a rectenna, such as rectenna 200. Further, as described above, each emitting body 306 and 318 may be at least partially embedded in a dielectric medium, such as a first dielectric medium 307 and a second dielectric medium 319, respectively.

In addition, each portion of stacked device 300, such as first portion 302 and second portion 304, may be configured to harvest thermal electromagnetic energy in a designated region of the frequency spectrum. For instance, first portion 302 may be configured to harvest microwave energy, and second portion 304 may be configured to harvest far infrared energy. To this end, first receiving antenna 308 may be configured to collect thermal electromagnetic energy in a first part of the frequency spectrum, such as, for example, microwave electromagnetic energy. Similarly, second receiving antenna 320 may be configured to collect thermal electromagnetic energy in a second part of the frequency spectrum, such as, for example, far infrared electromagnetic energy. First receiving antenna 308 may thus include a geometry and/or morphology suitable to the collection of electromagnetic energy in the microwave portion of the spectrum, while second receiving antenna 320 may include a geometry and/or morphology suitable to the collection of electromagnetic energy in the far infrared portion of the spectrum. In other words, first receiving antenna 308 may be the same as or different from second receiving antenna 320. Similarly, first rectifier 316 may be the same as or different from second rectifier 328.

For instance, where stacked device 300 is configured to harvest microwave and far infrared energy, first receiving antenna 308 may be a patch antenna having a patch length suitable for operation at resonant frequencies in the microwave frequency range, and first rectifier 316 may be a Schottky diode. In addition, second receiving antenna 320 may be patch antenna having a patch length suitable for operation at resonant frequencies in the far infrared frequency range, and second rectifier 328 may be a MIM diode or a tunnel diode.

Figure 4:
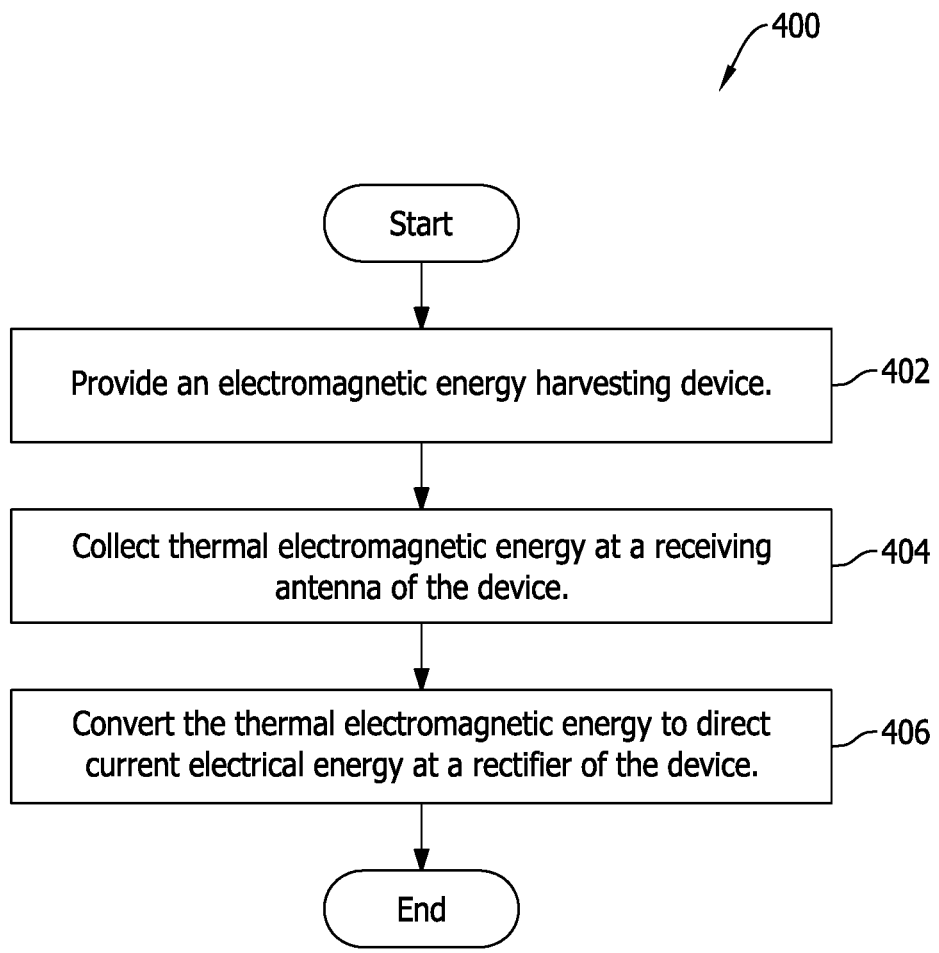
FIG. 4 is a flowchart illustrating an exemplary process for harvesting electromagnetic energy using the electromagnetic energy harvesting device shown at FIG. 1.

FIG. 4 is a flowchart illustrating an exemplary process 400 for harvesting electromagnetic energy using electromagnetic energy harvesting device 100 (shown at FIG. 1). Although process 400 is described in conjunction with device 100, it will be understood that process 400 may also be utilized with rectenna 200 and/or stacked device 300. Accordingly, in operation, device 100 may be provided for the purpose of harvesting thermal electromagnetic energy (step 402). More particularly, as described herein, device 100 may be provided in conjunction with load 114 for the purpose of delivering direct current electrical energy to load 114.

Further, where device 100 includes emitting body 102, device 100 may be positioned at any location suitable to provide direct current electrical energy to load 114, such as, for example, over a surface of load 114 and/or within a housing of load 114 (e.g., where, as described above, load 114 is a mobile communications device). On the other hand, where device 100 does not include emitting body 102, device 100 may be positioned in substantial proximity to emitting body 102, such that receiving antenna 104 of device 100 is suitably positioned to collect thermal electromagnetic energy emitted by emitting body 102.

Moreover, in the instance that emitting body 102 is packaged with device 100, emitting body 102 may be positioned in an emission path of an object that emits electromagnetic radiation, such as the sun, a reactor, such as a nuclear reactor, any type of engine, a mammalian body, and/or any other source of electromagnetic radiation. Under such circumstances, emitting body 102 may absorb electromagnetic energy emitted by the object. As emitting body 102 absorbs electromagnetic energy, emitting body 102 may store some of the energy as heat and may, in addition emit, or re-emit, some of the stored energy as thermal electromagnetic energy (e.g., electromagnetic energy in the microwave and/or far infrared frequency bands).

In addition, as described above, the geometry and/or material composition of emitting body 102 may be varied during operation, and as these parameters are varied, the thermodynamic gain components associated therewith (e.g., $G_{HSG}$ and/or $G_e$) may be varied as well. For example, device 100 may scan the surrounding environment to identify an object radiating a suitable amount of electromagnetic energy (e.g., a maximum amount of electromagnetic energy). This object may function as emitting body 102 (in the case that device 100 excludes emitting body 102), or the object may function to charge emitting body 102 within device 102 (in the case that device 100 includes emitting body 102).

In either instance, controller 108 may provide one or more instructions to a user of device 100, such as by way of a graphical user interface (not shown) coupled to controller 108 and presented via a display (not shown), such as an LED display, of device 100. The instructions may prompt the user, for example, to sweep device 100 through a range of motion, such as a three-hundred-and-sixty degree range of motion. The range of motion may be divided into segments or sectors, such as ten degree sectors (for a total of thirty-six sectors).

As device 100 travels through the range of motion, antenna 104 of device 100 may receive electromagnetic energy radiating within each sector, and controller 108 may, based upon the received data, identify a sector within which a suitable or maximum quantity of electromagnetic energy is radiating. Controller 108 may, in response, indicate (e.g., via the graphical user interface) a direction for the user to point device 100, where the direction may correspond to the sector associated with a suitable or maximum quantity of electromagnetic energy. The sector may, in addition, be occupied by an object that is associated with suitable and/or ideal thermodynamic gain components (such as object geometry and/or object material composition), as described above. Controller 108 may thus function to vary the thermodynamic gain properties of the object or emitting body 102 utilized by instructing the user to orient device 100 in a direction of a suitable object or emitting body 102.

Continuing, the thermal electromagnetic energy emitted by emitting body 102 may impinge upon receiving antenna 104, which may collect the thermal electromagnetic energy (step 404). As described herein, receiving antenna 104 may include any of a variety of suitable antenna geometries, such as, for example, a monopole geometry, a dipole geometry, an aperture geometry (e.g., a horn geometry), a Yagi-Uda geometry, and the like. In addition, in some embodiments, receiving antenna 104 may be a patch antenna and/or a waveguide, such as an overmode waveguide.

Irrespective of the specific antenna geometry, receiving antenna 104 may be configured to collect thermal electromagnetic energy over a broad range of frequencies within a particular band and/or over a plurality of bands, because, for example, it is not necessary that receiving antenna 104 conduct a particular frequency for the purpose of signal communications. Thus, receiving antenna 104 may be implemented to increase a signal gain associated with the collected thermal electromagnetic energy beyond a signal gain typically associated with the same antenna geometry where, for example, the antenna geometry is used for signal communications. Thus, in general terms, the geometry of receiving antenna 104 may be selected to modify a thermodynamic gain component (e.g., $G_A$) of device 100.

Moreover, where receiving antenna 104 is a waveguide, such as an overmode waveguide, receiving antenna 104 may be configured to conduct one more dominant frequencies and/or one or more effervescent frequencies to rectifier 112. Receiving antenna 104 may, in this way, be used to drive an increased (or higher gain) output voltage and/or current at the output of rectifier 112.

Receiving antenna 104 may generate alternating current electrical energy at an output, and this alternating current electrical energy may be transmitted, in various embodiments, to filter 106. As described herein, filter 106 may variably adjustable and/or variably tunable (e.g., by controller 108) to pass a wider or narrower band of the generated alternating current electrical energy to impedance matching element 110. For example, filter 106 may pass an expanded band of alternating current electrical energy to impedance matching element 110 in response to a determination by controller 108 that rectifier 112 will not be overloaded by the amount of energy passed by filter 106. Likewise, where controller 108 determines that rectifier 112 may be overloaded by the amount of energy passed by filter 106, controller 108 may reduce the passband of filter 106 to limit the flow of alternating current electrical energy to rectifier 112.

In addition, in the exemplary embodiment, impedance matching element 110 may be tuned or adjusted by controller 108 to vary the impedance matching between filter 106 and rectifier 112. For example, controller 108 may adjust an impedance of impedance matching element 110, such that filter 106 is more closely matched in impedance to rectifier 112, in response to a determination by controller 108 that rectifier 112 will not be overloaded by the amount of alternating current electrical energy produced at an output of filter 106.

On the other hand, controller 108 may adjust an impedance of impedance matching element 110, such that filter 106 is mismatched, or less closely matched, in impedance to rectifier 112, in response to a determination by controller 108 that rectifier may be overloaded by the amount of alternating current electrical energy produced at an output of filter 106. Further, where impedance matching element 110 rejects a portion of the alternating current electrical energy provided at the output of filter 106, the rejected portion may be passed back through filter 106 and retransmitted as electromagnetic energy by antenna 104, whereupon the energy may be reabsorbed by emitting body 102 for subsequent re-emission to antenna 104.

Rectifier 112 may receive the alternating current electrical energy output by impedance matching element 110 and may, in response, "rectify" the energy to generate direct current electrical energy (step 406). In other words, rectifier 112 may convert the alternating current electrical energy produced at the output of impedance matching element 110 to direct current electrical energy. This energy may be provided to load 114 for the purpose of driving or powering load 114.

Figure 5:
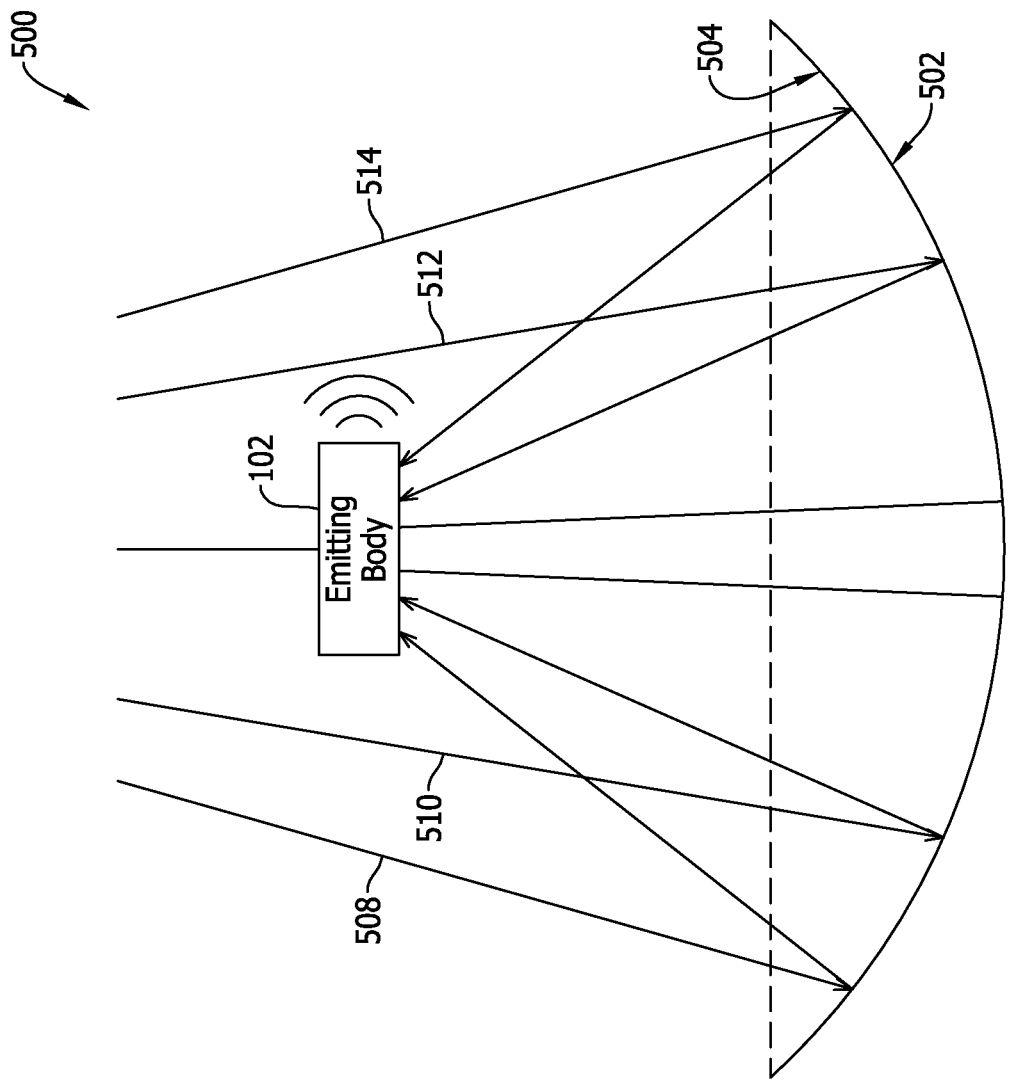
FIG. 5 is a schematic view of an exemplary electromagnetic energy harvesting device that includes a reflecting element.

FIG. 5 is a schematic view of an exemplary electromagnetic energy harvesting device 500 that includes a reflecting element 502, such as a parabolic dish. Reflecting element may include one or more mirrored or polished surfaces, such as a mirrored or polished interior surface 504. Surface 504 may, for example, be reflective to electromagnetic energy within particular frequency band, such as, for example, to electromagnetic energy in the visible portion of the frequency spectrum.

An emitting body, such as, for example, emitting body 102 may be positioned at a central point or "focus" of reflecting element 502, such that electromagnetic energy (depicted at FIG. 5 as rays 508, 510, 512, and 514) impinges upon and is reflected from surface 504 to concentrate at the focus on emitting body 102. Similarly, a pyramidal horn structure or a conical structure, such as reflecting structure 107, may be implemented to create an enclosed or semi-enclosed cavity that channels the power from emitting body 102 to receiving antenna 104 or an array of devices 100 (such as stacked device 300).

As described herein, emitting body 102 may absorb the focused electromagnetic energy (e.g., as heat energy) and may, in addition, re-emit the heat energy as thermal electromagnetic energy, which may be received by receiving antenna 104. Thus, in various embodiments, a reflecting element, such as reflecting element 502, may be implemented in conjunction with device 100 (and/or rectenna 200, and/or device 300), to increase a gain or output power of device 100 (and/or rectenna 200, and/or device 300). In other words, and in general terms, a reflecting element, such as reflecting element 502, may be included to modify a thermodynamic gain component (e.g., $G_{Hr}$) of device 100.

Embodiments of the present disclosure thus relate, in general terms, to a device for harvesting electromagnetic energy and, more particularly, to a device for harvesting electromagnetic energy, in which thermal electromagnetic energy emitted by an emitting body is collected by a receiving antenna disposed in proximity to the emitting body and converted to direct current electrical energy. To this end, the receiving antenna may be coupled (directly or indirectly) to a rectifier, which may convert thermal electromagnetic energy impinging upon and collected by the receiving antenna to direct current electrical energy. The device may be constructed and implemented, as described herein, such that a total or overall gain of the device is increased and/or decreased through the addition and/or subtraction of a plurality of thermodynamic gain ($G_T$) and electronic gain ($G_R$) components within the device. Thus, the device may generate direct current electrical energy suitable to power a load coupled to the device.

Exemplary embodiments of devices to and related components are described above in detail. The devices are not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where electromagnetic energy harvesting is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electromagnetic energy harvesting device comprising:
    at least one passive emitting body comprising an unpowered mass selected to operate as a heat source that absorbs ambient electromagnetic energy in any range of at least the visible electromagnetic spectrum and stores the absorbed ambient electromagnetic energy and spontaneously emits the stored electromagnetic energy as non-directed thermal electromagnetic energy in one or both of: i) at least some of the microwave portion of the electromagnetic spectrum, and ii) at least some of the far infrared portion of the electromagnetic spectrum,
    wherein the at least one passive emitting body includes at least one of a size, a shape, and a material composition selected to at least one of increase and decrease a thermodynamic gain of the passive emitting body;
    wherein the at least one passive emitting body is not a powered antenna electrically connected to a voltage source, and
    wherein the at least one passive emitting body is at least partially embedded within a dielectric medium;
    at least one receiving antenna disposed in proximity to the at least one passive emitting body, wherein the at least one receiving antenna is configured to collect at least some of the non-directed thermal electromagnetic energy emitted by the at least one passive emitting body; and
    at least one rectifier electrically coupled to the at least one receiving antenna, the at least one rectifier configured to convert the collected thermal electromagnetic energy to direct current electrical energy.

2. The electromagnetic energy harvesting device of claim 1, further comprising at least one filter electrically coupled between the at least one receiving antenna and the at least one rectifier.

3. The electromagnetic energy harvesting device of claim 2, wherein the at least one filter is a tunable filter.

4. The electromagnetic energy harvesting device of claim 3, further comprising a controller communicatively coupled to the at least one filter and configured to control a frequency range associated with the filter and at least one of monitor or adjust i) a temperature of the passive emitting body, ii) a dynamic energy fluctuation associated with the electromagnetic energy harvesting device, or iii) a demand associated with the load.

5. The electromagnetic energy harvesting device of claim 1, wherein the at least one rectifier is at least one of a Schottky diode, a metal-insulator-metal diode, a tunnel diode, or a passive intermodulation device.

6. The electromagnetic energy harvesting device of claim 1, wherein the at least one receiving antenna comprises at least one of a monopole antenna, a dipole antenna, a rectangular microstrip antenna, an antenna array, or a waveguide.

7. The electromagnetic energy harvesting device of claim 1, wherein the at least one receiving antenna is configured to receive over-moded radiation.

8. The electromagnetic energy harvesting device of claim 1, wherein the at least one receiving antenna is configured to collect non-directed thermal electromagnetic energy over at least a portion of the frequency range of 300 Megahertz to 300 Gigahertz.

9. The electromagnetic energy harvesting device of claim 1, wherein the at least one receiving antenna is configured to collect non-directed thermal electromagnetic energy over at least a portion of the frequency range of 300 Gigahertz to 20 Terahertz.

10. The electromagnetic energy harvesting device of claim 1, wherein the at least one passive emitting body is configured to absorb electromagnetic energy focused on the at least one passive emitting body by a reflecting element.

11. The electromagnetic energy harvesting device of claim 1, further comprising an impedance matching circuit configured to at least one of:
    (a) match an impedance between a filter and the at least one rectifier; or
    (b) mismatch an impedance between the filter and the at least one rectifier, wherein the impedance matching circuit is configured to mismatch the impedance between the filter and the at least one rectifier, in at least some cases, to safeguard the at least one rectifier from an overcurrent or overvoltage condition.

12. The electromagnetic energy harvesting device of claim 1, further comprising a controller coupled to the at least one receiving antenna, the controller configured to execute instructions stored on a computer-readable memory, which when executed, cause the controller to at least:

control the at least one receiving antenna to scan at least a portion of a three-hundred-and-sixty degree range of motion, the three-hundred-and-sixty degree range of motion including a plurality of sectors, each sector less than three-hundred-and-sixty degrees; and identify, based upon the scanning, a sector associated with a desired thermal electromagnetic energy.

13. The electromagnetic energy harvesting device of claim 12, wherein the instructions, when executed, further cause the controller to at least control a display device communicatively coupled to the controller to display an instruction to a user, the instruction prompting the user to orient the electromagnetic energy harvesting device in a direction of the identified sector that is associated with the desired thermal electromagnetic energy.

14. The electromagnetic energy harvesting device of claim 13, wherein the desired thermal electromagnetic energy is one of a maximum thermal electromagnetic energy or less than the maximum thermal electromagnetic energy.

15. The electromagnetic energy harvesting device of claim 1, wherein the at least one receiving antenna comprises an array of series connected receiving antennas.

16. An electromagnetic energy harvesting device comprising:
a first portion comprising:
a first passive emitting body comprising a first unpowered mass selected to operate as a heat source that absorbs ambient electromagnetic energy in any range of at least the visible electromagnetic spectrum and stores the absorbed ambient electromagnetic energy and spontaneously emits the stored electromagnetic energy as non-directed thermal electromagnetic energy in at least some of the microwave and far infrared portions of the electromagnetic spectrum, wherein the first passive emitting body is not a powered antenna electrically connected to a voltage source, wherein the first passive emitting body is at least partially embedded within a dielectric medium, and wherein the first passive emitting body includes at least one of a size, a shape, and a material composition selected to at least one of increase and decrease a thermodynamic gain of the first passive emitting body;
a first receiving antenna configured to collect at least some of the non-directed thermal electromagnetic energy emitted by the first passive emitting body; and
a first rectifier electrically coupled to the first receiving antenna, the first rectifier configured to convert the collected thermal electromagnetic energy to direct current electrical energy; and
a second portion comprising:
a second passive emitting body comprising a second unpowered mass that absorbs and stores ambient electromagnetic energy and spontaneously emits the stored electromagnetic energy as non-directed thermal electromagnetic energy in at least some of the microwave and far infrared portions of the electromagnetic spectrum, and wherein the second passive emitting body is not a powered antenna electrically connected to a voltage source;
a second receiving antenna configured to collect at least some of the non-directed thermal electromagnetic energy emitted by the second passive emitting body; and
a second rectifier electrically coupled to the second receiving antenna, the second rectifier configured to convert the collected thermal electromagnetic energy to direct current electrical energy.

17. The electromagnetic energy harvesting device of claim 16, wherein the first portion and the second portion are stacked.

18. The electromagnetic energy harvesting device of claim 16, further comprising:
a first filter electrically coupled between the first receiving antenna and the first rectifier; and
a second filter electrically coupled between the second receiving antenna and the second rectifier.

19. The electromagnetic energy harvesting device of claim 16, wherein the second passive emitting body is at least partially embedded within another dielectric medium.

20. The electromagnetic energy harvesting device of claim 16, wherein the first receiving antenna comprises at least one of a monopole antenna, a dipole antenna, a rectangular microstrip antenna, an antenna array, or a waveguide, and wherein the second receiving antenna comprises at least one of a monopole antenna, a dipole antenna, a rectangular microstrip antenna, an antenna array, or a waveguide.

21. The electromagnetic energy harvesting device of claim 16, wherein the first receiving antenna is configured to receive over-moded radiation, and wherein the second receiving antenna is configured to receive over-moded radiation.

22. The electromagnetic energy harvesting device of claim 16, wherein the first portion and the second portion are electrically coupled in one of parallel or series.

23. The electromagnetic energy harvesting device of claim 16, wherein the first receiving antenna is configured to collect the non-directed thermal electromagnetic energy in at least one of the microwave portion of the electromagnetic spectrum or the far infrared portion of the electromagnetic spectrum, and wherein the second receiving antenna is configured to collect the non-directed thermal electromagnetic energy in at least one of the microwave portion of the electromagnetic spectrum or the far infrared portion of the electromagnetic spectrum.

24. A method for harvesting electromagnetic energy, the method comprising:
providing an electromagnetic energy harvesting device comprising:
at least one passive emitting body comprising an unpowered mass that operates as a heat source and that absorbs ambient electromagnetic energy in any range of at last the visible electromagnetic spectrum and stores the absorbed ambient electromagnetic energy and spontaneously emits the stored electromagnetic energy as non-directed thermal electromagnetic energy in at least one of the microwave or far infrared portions of the electromagnetic spectrum, wherein the at least one passive emitting body is not a powered antenna electrically connected to a voltage source wherein the at least one passive emitting body is at least partially embedded within a dielectric medium, and wherein the at least one passive emitting body includes at least one of a size, a shape, and a material composition selected to at least one of increase and decrease a thermodynamic gain of the at least one passive emitting body;
at least one receiving antenna; and
at least one rectifier electrically coupled to the at least one receiving antenna;

collecting at least some of the non-directed thermal electromagnetic energy by the least one receiving antenna; and converting the collected thermal electromagnetic energy to direct current electrical energy by the least one rectifier.

25. An electromagnetic energy harvesting device comprising:

at least one receiving antenna configured to collect thermal electromagnetic energy in at least one of a microwave portion of the electromagnetic spectrum or a far infrared portion of the electromagnetic spectrum, wherein the thermal electromagnetic energy is emitted by at least one emitting body, wherein the at least one emitting body includes an unpowered mass that operates as a heat source and that absorbs ambient electromagnetic energy in any range of at least the visible electromagnetic spectrum and stores the absorbed ambient electromagnetic energy and spontaneously emits the stored electromagnetic energy as the thermal electromagnetic energy, wherein the at least one emitting body includes at least one of a size, a shape, and a material composition selected to at least one of increase and decrease a thermodynamic gain of the at least one emitting body, wherein the at least one emitting body is not a powered antenna electrically connected to a voltage source, and wherein the at least one emitting body is at least partially embedded within a dielectric medium; and at least one rectifier electrically coupled to the at least one receiving antenna, the at least one rectifier configured to convert the collected thermal electromagnetic energy to direct current electrical energy.

* * * * *

UNITED STATES PATENT AND TRADEMARK OFFICE
CERTIFICATE OF CORRECTION

PATENT NO. : 11,824,258 B2
APPLICATION NO. : 17/077886
DATED : November 21, 2023
INVENTOR(S) : Richard A. Bean Page 1 of 1

It is certified that error appears in the above-identified patent and that said Letters Patent is hereby corrected as shown below:

In the Claims

In Column 16, Line 58: Add a --,-- after the word "source"

Signed and Sealed this
Twenty-first Day of May, 2024

Katherine Kelly Vidal
*Director of the United States Patent and Trademark Office*